US008587821B2

(12) United States Patent
Murayama

(10) Patent No.: US 8,587,821 B2
(45) Date of Patent: Nov. 19, 2013

(54) TAPE PRINTER, METHOD FOR CONTROLLING TAPE PRINTER, AND COMPUTER PROGRAM PRODUCT

(75) Inventor: Noriaki Murayama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 13/049,613

(22) Filed: Mar. 16, 2011

(65) Prior Publication Data

US 2011/0236110 A1 Sep. 29, 2011

(30) Foreign Application Priority Data

Mar. 26, 2010 (JP) ................................ 2010-072433

(51) Int. Cl.
*G06K 15/00* (2006.01)
*B41J 11/00* (2006.01)
*B41J 9/44* (2006.01)

(52) U.S. Cl.
USPC ............... 358/1.18; 400/582; 400/76; 400/61

(58) Field of Classification Search
USPC .......................................... 400/582; 358/1.18
See application file for complete search history.

(56) References Cited

U.S. PATENT DOCUMENTS 5,344,247 A * 9/1994 Sakuragi et al. .............. 400/582
5,374,132 A * 12/1994 Kimura ......................... 400/586
6,050,734 A * 4/2000 Watanabe et al. .......... 400/615.2
6,106,170 A * 8/2000 Watanabe et al. ............... 400/61
6,134,016 A 10/2000 Watanabe et al.
6,532,078 B2 3/2003 Hayama
7,997,815 B2 * 8/2011 Ito et al. .......................... 400/61
2009/0010663 A1 * 1/2009 Ishikawa et al. ................ 399/45

FOREIGN PATENT DOCUMENTS

JP 08-290618 A 11/1996
JP 10-058757 A 3/1998
JP 11-157136 A 6/1999
JP 11-157137 A 6/1999
JP 2005-223833 A 8/2005
JP 2008-283647 A 11/2008

* cited by examiner

*Primary Examiner* — Marivelisse Santiago Cordero
*Assistant Examiner* — Moustapha Diaby
(74) *Attorney, Agent, or Firm* — ALG Intellectual Property, LLC

(57) ABSTRACT

A tape printer having a large-size printing function of printing an enlarged printing image which is larger than the tape width of a long tape into a plurality of tape parts, includes: a tape width detecting section detecting the tape width; a layout determination section determining enlargement layout information for forming the enlarged printing image; a margin determining section determining the widths of an upper margin and a lower margin of the enlarged printing image and determining whether or not the sum of the determined margin widths is equal to or greater than the tape width; an image data generating section generating image data of the enlarged printing image; and a printing section sequentially printing, on two or more tape parts respectively, the image data of the enlarged printing image other than part of the upper margin and part of the lower margin.

6 Claims, 9 Drawing Sheets

(NORMAL PRINTING IMAGE)

(FOUR-TIMES ENLARGED PRINTING IMAGE)

(NORMALLY PRINTED LABEL)

(FOUR-TIMES ENLARGED PRINTED LABEL (EXISTING EXAMPLE))

(FOUR-TIMES ENLARGED PRINTED LABEL (MARGIN PART IS NOT OUTPUT))

TAPE PRINTER, METHOD FOR CONTROLLING TAPE PRINTER, AND COMPUTER PROGRAM PRODUCT

CROSS-REFERENCE

The present application claims priority from Japanese Patent Application No. 2010-072433 filed on Mar. 26, 2010, which is hereby incorporated by reference in its entirety.

BACKGROUND

In the past, a tape printer having a so-called "large-size printing function" of forming a printing image by pasting a plurality of tape parts (tape pieces) together, the tape parts on each of which part of a printing image that is larger than a tape width is printed, has been known (for example, Japanese Patent Publication No. 11-157136). The tape printer having this large-size printing function can form a printing image, that is, an enlarged printing image by arranging printed tape parts on each of which part of the printing image is printed, the tape parts having the same length, parallel to each other in the tape width direction.

Furthermore, an image data generating apparatus (a tape printer) which deletes, with a large-size printing function, non-printing image regions which are a front end part and a back end part in the tape length direction, the front end part and the back end part in which no printing image is present, has been disclosed (Japanese Patent Publication No. 2008-283647). According to such an image data generating apparatus, it is possible to reduce use of tape in the tape length direction in large-size printing.

However, in the large-size printing function, non-printing image regions which are an upper end part (an upper margin) and a lower end part (a lower margin) in which no printing image is present are generated also in the tape width direction. When the sum of these non-printing image regions is equal to or greater than a tape width, these non-printing image regions sometimes become useless.

SUMMARY

Various embodiments may solve at least part of the problems described above, and to reduce a waste of tape to a minimum.

According to at least one embodiment of the disclosure, there is provided a tape printer for printing on a long tape, the tape printer having a large-size printing function of being configured to divide an enlarged printing image, which has an image width larger than the tape width of the long tape into two or more images, and to sequentially print the two or more images respectively on two or more tape parts of the long tape, so that the enlarged printing image is formed by arranging two or more printed tape parts parallel to each other in a tape width direction, the tape printer comprising: a tape width detecting section detecting the tape width of the long tape; a layout determination section determining enlargement layout information indicating the layout of a character or graphics forming the enlarged printing image; a margin determining section determining the widths of an upper margin and a lower margin of the enlarged printing image in the tape width direction based on the enlargement layout information determined by the layout determining section and determining whether or not the sum of the determined margin widths is equal to or greater than the tape width of the long tape; an image data generating section generating image data of the enlarged printing image based on the enlargement layout information determined by the layout determining section; and a printing section sequentially printing, on two or more tape parts respectively, the image data of the enlarged printing image other than part of the upper margin and part of the lower margin based on the determination result obtained by the margin determining section.

According to such a tape printer, the tape width detecting section detects the tape width. The layout determination section determines enlargement layout information indicating the layout of a character or graphics. The margin determining section determines whether or not a width corresponding to the sum of the upper margin and the lower margin of the enlarged printing image is equal to or greater than the tape width. The image data generating section generates image data of the enlarged printing image based on the enlargement layout information. The printing section sequentially prints, on one or more than one tape part, the image data of the enlarged printing image other than an image part corresponding to a margin having the tape width, the margin included in the sum of at least part of the upper margin and at least part of the lower margin. As a result, when the sum of at least part of the upper margin and at least part of the lower margin is equal to or greater than the tape width, parts of the upper margin and the lower margin, the parts whose sum corresponds to the tape width, are not output from the tape printer as a printing image, making it possible to reduce use of tape. Here, the margin means a non-printing image region in which no printing image is present.

According to at least one embodiment of the disclosure, there is provided a method for controlling a tape printer for printing on a long tape, the tape printer having a large-size printing function of being configured to divide an enlarged printing image, which has an image with larger than the tape width of the long tape, into two or more images, and to sequentially print the two or more images respectively on two or more tape parts of the long tape, so that the enlarged printing image is formed by arranging two or more printed tape parts parallel to each other in a tape width direction, the method comprising: a tape width detection step of detecting the tape width of the long tape; a layout determination step of determining enlargement layout information indicating the layout of a character or graphics forming the enlarged printing image; a margin determination step of determining the margin widths of an upper margin and a lower margin of the enlarged printing image in the tape width direction based on the enlargement layout information determined in the layout determination step and determining whether or not the sum of the determined margin widths is equal to or greater than the tape width of the long tape; an image data generation step of generating image data of the enlarged printing image based on the enlargement layout information determined by the layout determining section; and a printing step of sequentially printing, on two or more tape parts respectively, the image data of the enlarged printing image other than part of the upper margin and part of the lower margin based on the determination result obtained in the margin determination step.

According to such a method for controlling a tape printer, when the sum of at least part of the upper margin and at least part of the lower margin is equal to or greater than the tape width, the part of the upper margin and the part of the lower margin are not output from the tape printer. As a result, it is possible to reduce use of tape.

According to at least one embodiment of the disclosure, there is provided a computer program product for making a computer execute the steps of the above-described method for controlling a tape printer.

By making the computer execute such a computer program product, when the sum of at least part of the upper margin and at least part of the lower margin is equal to or greater than the tape width, the part of the upper margin and the part of the lower margin are not output from the tape printer. As a result, it is possible to reduce use of tape.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

Hereinafter, embodiments will be described with reference to the accompanying drawings.

First Embodiment

In a first embodiment, a tape printer which sequentially prints image data of an enlarged printing image other than apart which is equal to or greater than a tape width from part of an upper margin and part of a lower margin at the time of large-size printing will be described.

Figure 1:
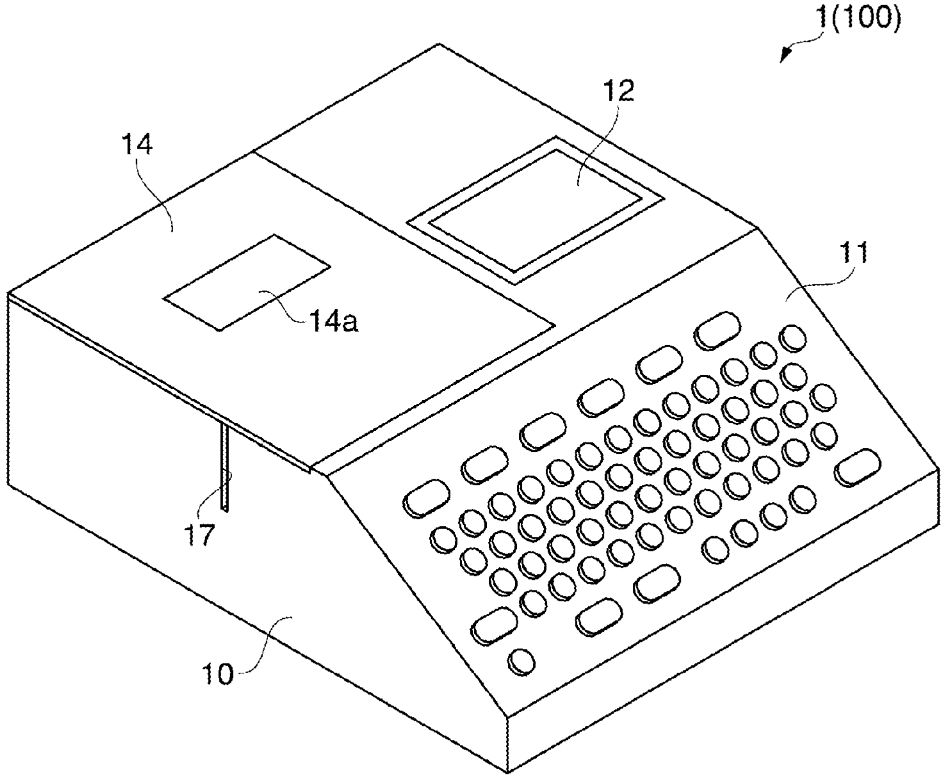
FIG. 1 is a perspective view showing a tape printer of a first embodiment.
Figure 2:
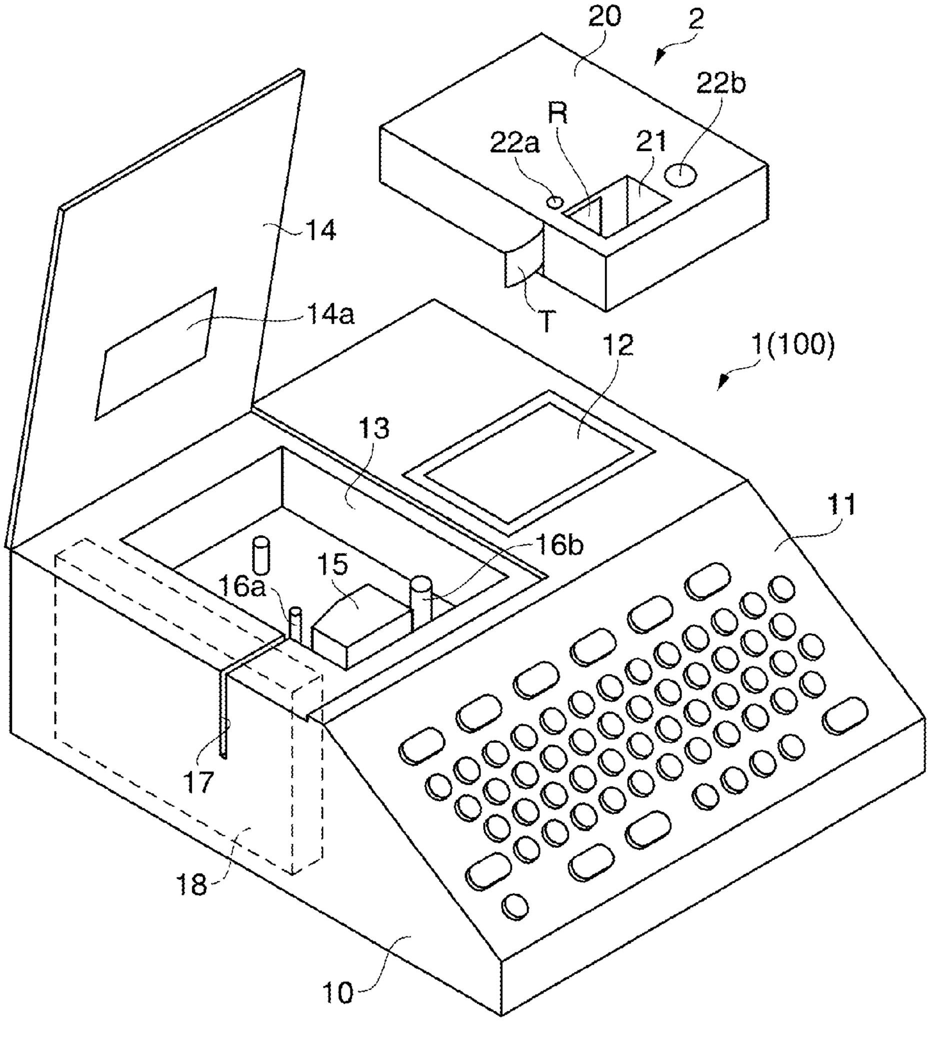
FIG. 2 is a perspective view showing the tape printer of the first embodiment.

FIGS. 1 and 2 are perspective views showing a tape printer of this embodiment.

As shown in FIGS. 1 and 2, a tape printer 1 has a structure in which a main body is housed in a cabinet 10, and the cabinet 10 has a keyboard 11 on the front upper face thereof. The keyboard 11 is an entry section which accepts various entry operations, such as an entry of a character string, performed by the user, and has a large number of character keys by which a character string composed of a kana character, a kanji character, an alphabet, a numeric, a symbol, etc. can be entered and a plurality of control keys for giving an instruction of various operations to the tape printer 1. The control keys of the keyboard 11 include a power supply key for switching a power supply on and off, a conversion key for converting entered kana characters into a kanji character, an Enter key for confirming the entered character string or the like, a cursor key used, for example, to move a cursor, a printing key for making the tape printer 1 perform printing, a large-size printing key for making the tape printer 1 perform large-size printing, etc.

The cabinet 10 has a display section 12 on the upper face thereof near the back, the display section 12 formed of a liquid crystal display device and the like. The display section 12 forms an image with a large number of pixels arranged in a matrix, and is used to display a character entered from the keyboard 11 and display a menu screen and a message screen.

Next to the display section 12, the cabinet 10 has a concave portion 13 formed on the upper face thereof near the back, the concave portion 13 into which a tape cartridge 2 is placed. On the opening of the concave portion 13, an opening and closing lid 14 is provided so as to be openable and closable, and, by bringing the opening and closing lid 14 into an open state, the tape cartridge 2 can be attached and detached. Moreover, the opening and closing lid 14 has a translucent confirmation window 14*a*, which allows the user to check visually and externally whether or not the tape cartridge 2 is placed in the concave portion 13. At the bottom of the concave portion 13, a thermal head 15 and rotating shafts 16*a* and 16*b* forming a conveying mechanism 16 (see FIG. 3) are provided. When the tape cartridge 2 is placed into the concave portion 13, the thermal head 15 fits into a hole-shaped head fit portion 21 provided in the tape cartridge 2, and the rotating shafts 16*a* and 16*b* are engaged in hole-shaped driven sections 22*a* and 22*b*, respectively.

The tape cartridge 2 has a built-in tape T and a built-in ink ribbon R, of which both are belt-shaped, in a cartridge case 20. The tape T is a printing medium of the tape printer 1, and has a structure in which an adhesive layer is formed on the back of a base material formed of PET (polyethylene terephthalate) or paper material and the adhesive layer is covered with release paper. The tape printer 1 can support two or more types of tape cartridge 2 which differ in width, material (material of the base material), color, etc. of the tape T, and the user can use a tape cartridge 2 according to the use or preference. Incidentally, on the back of the tape cartridge 2, a plurality of holes (not shown) for identifying the built-in tape T are provided, whereby the tape printer 1 can identify the tape type of the tape cartridge 2 placed in the concave portion 13 by an identification sensor 19 (see FIG. 3), such as a microswitch, provided on the bottom of the concave portion 13. Here, the tape type information includes tape width information, and the identification sensor 19 corresponds to a tape width detecting section.

When the tape cartridge 2 is placed into the concave portion 13, the front surface of the tape T faces the thermal head 15 in the head fit portion 21 with the ink ribbon R placed between the front surface of the tape T and the thermal head 15. The thermal head 15 has a large number of heater elements (not shown) formed therein, the heater elements arranged in line in a direction perpendicular to the longitudinal direction (the direction in which the tape T is conveyed) of the tape T, and selectively makes each heater element generate heat, whereby the ink of the ink ribbon R is transferred (thermally transferred) to the front surface of the tape T. That is, a dot is formed on the front surface of the tape T in a position corresponding to the heater element which has generated heat. Here, when the rotating shafts 16*a* and 16*b* are driven and rotated, the tape T and the ink ribbon R are conveyed, the tape T is then ejected to the outside of the cartridge case 20, and the ink ribbon R is reeled in in the cartridge case 20. Then, by repeating the above-described thermal transfer while gradually conveying the tape T and the ink ribbon R, an image formed of a plurality of dots is printed on the front surface of the tape T.

In a side face of the cabinet 10, a slit 17 which makes the outside of the cabinet 10 and the concave portion 13 communicate with each other is provided, and the printed tape T ejected from the cartridge case 20 passes through the slit 17, and a predetermined length thereof is conveyed toward the outside of the cabinet 10. Inside the cabinet 10, a cutter unit 18 for cutting the tape T crossing the slit 17 is provided. The printed part of the tape T is cut by the cutter unit 18, and is ejected out of an opening (a tape ejection port) of the slit 17 as a tape piece (a label).

Figure 3:
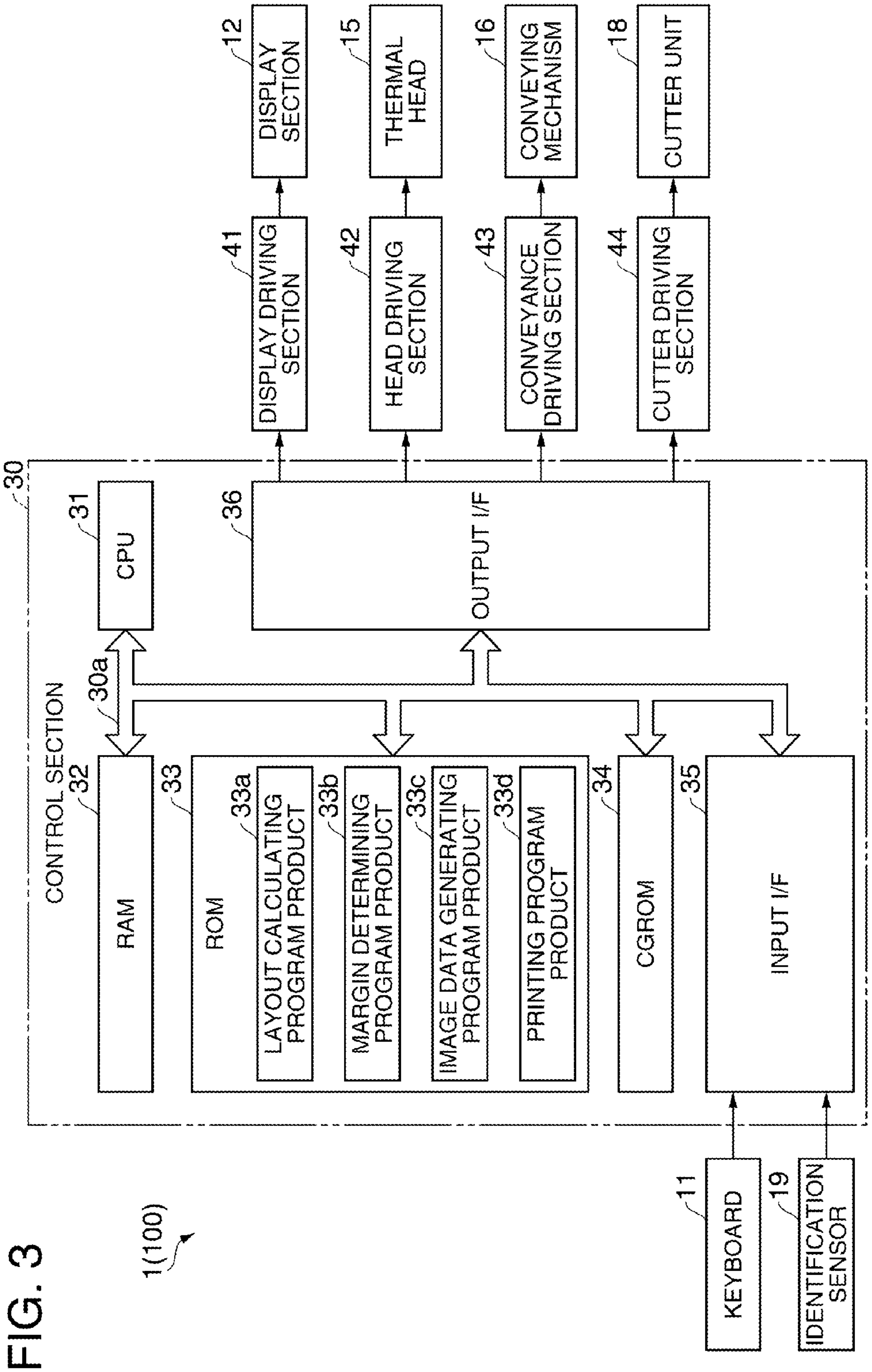
FIG. 3 is a block diagram showing a circuit configuration of the tape printer.

FIG. 3 is a block diagram showing a circuit configuration of the tape printer 1.

As shown in FIG. 3, in addition to the keyboard 11, the display section 12, the thermal head 15, the conveying mechanism 16 including the rotating shafts 16*a* and 16*b* (see FIG. 2), the cutter unit 18, and the identification sensor 19 which have been described above, the tape printer 1 includes a control section 30 which performs centralized control of the operation of the tape printer 1, a display driving section 41 which makes the display section 12 display an image, a head driving section 42 which drives the thermal head 15 and makes the thermal head 15 generate heat, a conveyance driving section 43 which drives the conveying mechanism 16, a cutter driving section 44 which drives the cutter unit 18, etc.

The control section 30 functions as a computer, and has a CPU (central processing unit) 31, RAM (random access memory) 32, ROM (read only memory) 33, CGROM (character generator ROM) 34, an input interface (I/F) 35, an output interface (I/F) 36, and the like, which are connected to each other via a bus 30*a*.

The CPU 31 operates in accordance with a control program product stored in the ROM 33, and controls various operations of the whole of the tape printer 1.

The RAM 32 is a storage section formed of volatile memory, and temporarily stores various processing results of the CPU 31, a character code string entered from the keyboard 11, display image data to be displayed by the display section 12, printing image data to be printed by the thermal head 15, etc. Furthermore, the RAM 32 also stores various flags and the like. Moreover, the RAM 32 also stores document data and the like which is formed of a character code string. Incidentally, the document data and the like may be stored in flash memory or the like which is nonvolatile memory.

The ROM 33 and the CGROM 34 are storage sections formed of nonvolatile memory such as mask ROM or flash memory, and the ROM 33 stores the above-described control program product, various data, and the like. Moreover, the ROM 33 stores a layout calculating program product 33*a* which calculates layout information indicating the layout of a printing image of characters and graphics based on a character code string and a margin determining program product 33*b* which calculates the widths of an upper margin and a lower margin of a printing image in the tape width direction based on the layout information of an enlarged printing image at the time of large-size printing and determines whether or not the sum of the widths is equal to or greater than a tape width. In addition, the ROM 33 stores an image data generating program product 33*c* which generates image data of a printing image or an enlarged printing image based on the layout information and a printing program product 33*d* which prints the image data of the printing image or the enlarged printing image on the tape T.

The CGROM 34 stores font data of characters which can be printed by the tape printer 1. The font data is data in the bit map format, the data for generating a character to be printed by the thermal head 15 and a character to be displayed by the display section 12. The font data in the bit map format is formed of a large number of dots, and each dot corresponds to the heater element of the thermal head 15 and the pixel of the display section 12. The CGROM 34 stores font data of a plurality of fonts, and the CPU 31 acquires corresponding font data from the CGROM 34 by specifying a font type, a character size, and a character code, and generates display image data and printing image data by using this font data. Incidentally, as the font data, font data in an outline format, which is easily related to various character sizes, may be used.

To the input interface 35, the keyboard 11 and the identification sensor 19 are connected. When the keyboard 11 is operated by the user, the keyboard 11 accepts this operation, and outputs key information corresponding to the operated key to the CPU 31 via the input interface 35. Moreover, the identification sensor 19 outputs identification information (including tape width information) according to the tape type of the tape cartridge 2 placed in the concave portion 13 to the CPU 31 via the input interface 35.

To the output interface 36, the display driving section 41, the head driving section 42, the conveyance driving section 43, and the cutter driving section 44 are connected, and these sections drive the display section 12, the thermal head 15, the conveying mechanism 16, and the cutter unit 18, respectively, based on the control from the CPU 31.

In the tape printer 1 configured as described above, when the power supply key is operated by the user, the tape printer 1 starts operating, whereby characters can be entered by means of the character keys, and various instructions can be given by means of the control keys.

Here, when a character is entered as a result of the character key being operated by the user, the keyboard 11 accepts this entry, and outputs key information to the control section 30. Based on the key information input from the keyboard 11, the control section 30 identifies a character code of the entered character, and stores the character code in the RAM 32. Then, the control section 30 acquires font data corresponding to the character code from the CGROM 34, and generates display image data by using the font data thus acquired. When the control section 30 supplies the display image data to the display driving section 41, the entered character is displayed on the display section 12. Then, when the user repeats an entry of a character multiple times, a character code string (text data) including a plurality of character codes is stored in the RAM 32, and a character string formed of a plurality of characters is displayed on the display section 12.

When the printing key is operated by the user after the character (the character string) is entered, the tape printer 1 performs printing processing.

Here, the tape printer 1 of this embodiment can divide a printing image (an enlarged printing image) which is larger than the tape width of the tape T into a plurality of images and sequentially print the images on a plurality of tape parts, and can perform "large-size printing" by which an enlarged printing image is formed by arranging a plurality of printed labels, which are formed by printing, parallel to each other in the tape width direction.

Next, large-size printing will be described. First, operation and screen display performed at the time of large-size printing will be described.

Figure 4A:
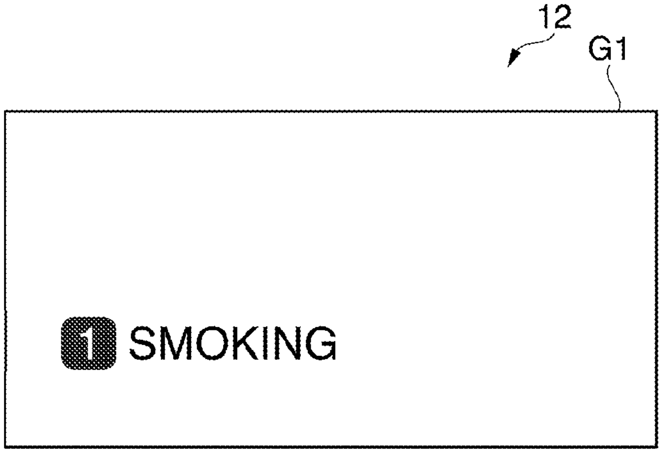
FIGS. 4A to 4C are explanatory diagrams showing the screen of a display section of the tape printer when large-size printing is performed, FIG. 4A being an explanatory diagram showing a character string entry screen, FIG. 4B being an explanatory diagram showing a screen making the user select a magnification, and FIG. 4C being an explanatory diagram showing a screen for making the tape printer perform large-size printing.
Figure 4B:
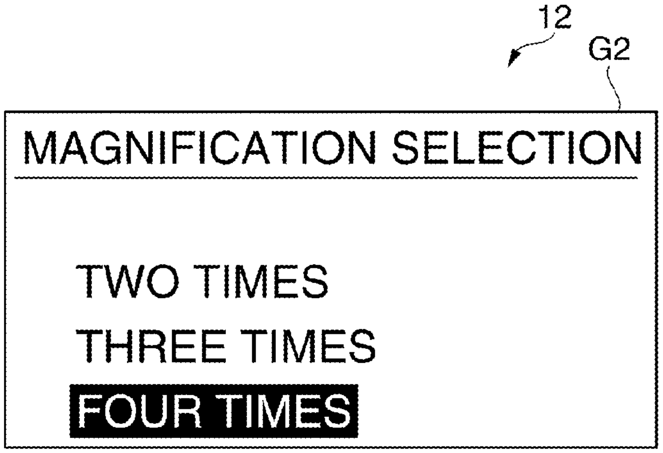
Figure 4C:
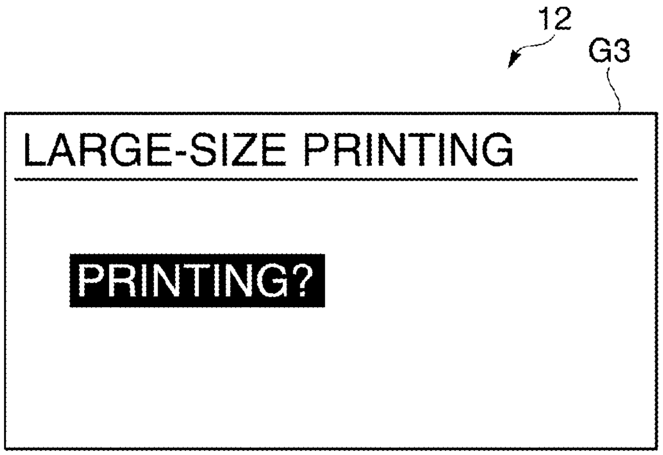

FIGS. 4A to 4C are explanatory diagrams showing the screen of the display section 12 of the tape printer 1 when large-size printing is performed, FIG. 4A is an explanatory diagram showing a character string entry screen, FIG. 4B is an explanatory diagram showing a screen making the user select a magnification, and FIG. 4C is an explanatory diagram showing a screen making the tape printer 1 perform large-size printing.

FIG. 4A is a character string entry screen G1 making the user enter a character string. On the character string entry screen G1, a sign representing a line number and a character string entered by the user are displayed. When the large-size printing key of the keyboard 11 is pressed in the character string entry screen G1, a magnification selection screen making the user select a magnification in large-size printing is displayed.

FIG. 4B is a magnification selection screen G2. In the uppermost part of the magnification selection screen G2, the character string of "MAGNIFICATION SELECTION" indicating that this screen is a magnification selection screen is displayed. Under that character string, the character strings of "TWO TIMES", "THREE TIMES", and "FOUR TIMES" are displayed in this order. The user can select any one of "TWO TIMES", "THREE TIMES", and "FOUR TIMES" by pressing the cursor key of the keyboard 11 and then pressing the Enter key. The selected magnification is stored in the RAM 32. Incidentally, an option which is currently selected is displayed in a black-and-white highlighted character.

When the magnification is selected in the magnification selection screen G2, a large-size printing confirmation screen is displayed.

FIG. 4C is an explanatory diagram showing a large-size printing confirmation screen G3. In the uppermost part of the large-size printing confirmation screen G3, the character string of "LARGE-SIZE PRINTING" indicating that this is a large-size printing confirmation screen is displayed. Under that character string, the character string of "PRINTING?" is highlighted in black and white. The user can perform large-size printing by pressing the Enter key of the keyboard 11.

Figure 5:
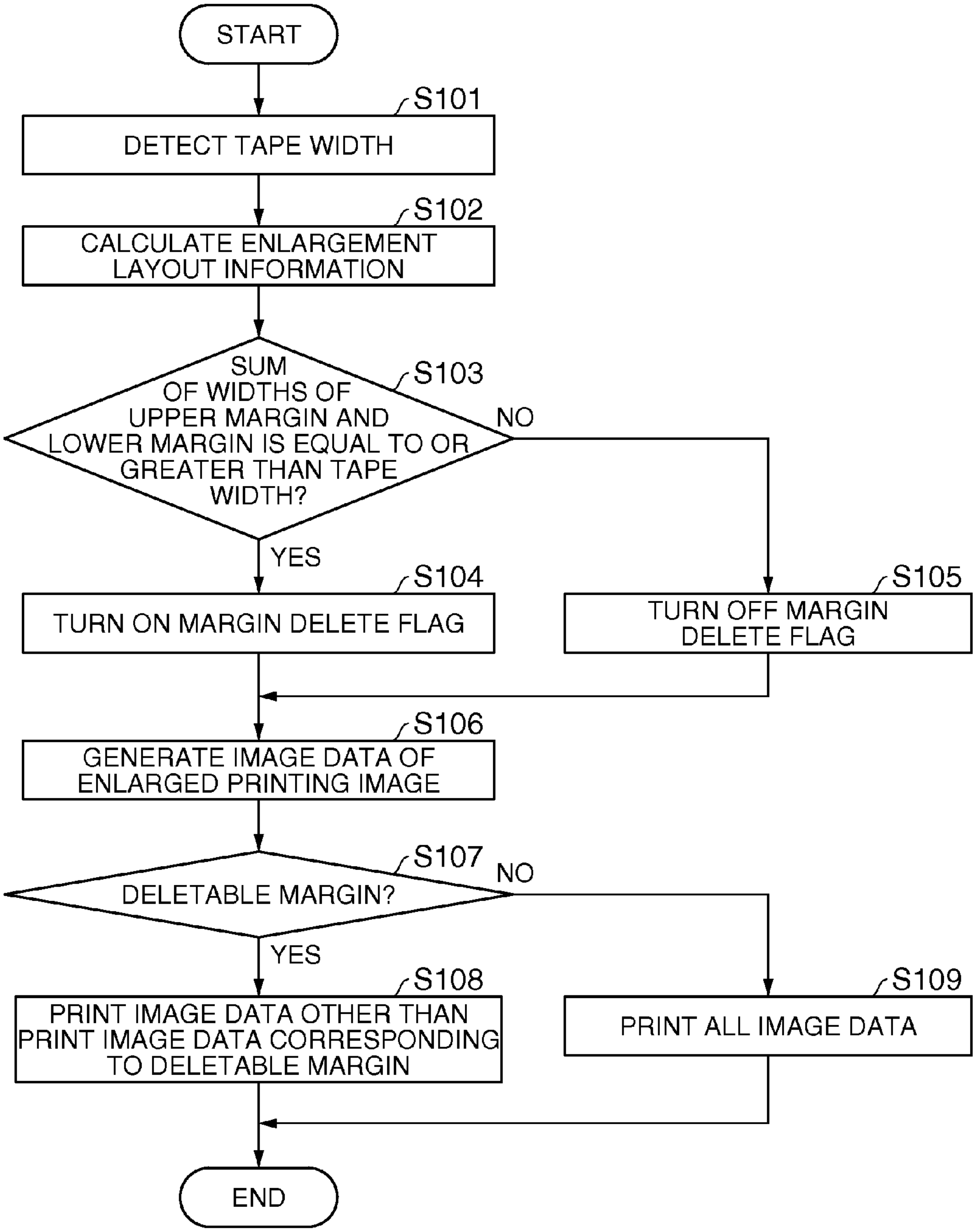
FIG. 5 is a flowchart for explaining large-size printing processing.

When large-size printing is performed by the user in the large-size printing confirmation screen G3, the tape printer 1 performs large-size printing processing (a flowchart) shown in FIG. 5.

FIG. 5 is a flowchart for explaining large-size printing processing. The large-size printing processing will be described by using FIG. 5.

When large-size printing is performed by the user, the control section 30 detects the tape width of the tape cartridge 2 placed in the concave portion 13 based on the information from the identification sensor 19 (step S101). Then, the control section 30 calculates enlargement layout information by executing the layout calculating program product 33*a* (step S102). Specifically, the control section 30 calculates the layout coordinates of the character or graphics in an enlarged printing image based on the tape width, the magnification, the setting information on the entered character or graphics and the size thereof, the setting information on the decoration of the character or graphics, etc. The control section 30 here corresponds to a layout calculating section.

Next, the control section 30 determines whether or not the sum of an upper margin and a lower margin of the enlarged printing image in the tape width direction is equal to or greater than the tape width by executing the margin determining program product 33*b* (step S103).

Here, a margin and a tape width in an enlarged printing image will be described.

Figure 6A:
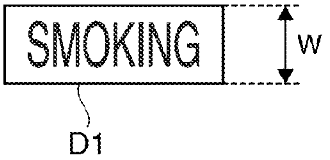
FIGS. 6A and 6B are explanatory diagrams about a printing image, FIG. 6A being an explanatory diagram of a normal printing image, and FIG. 6B being an explanatory diagram of a four-times enlarged printing image.
Figure 6B:
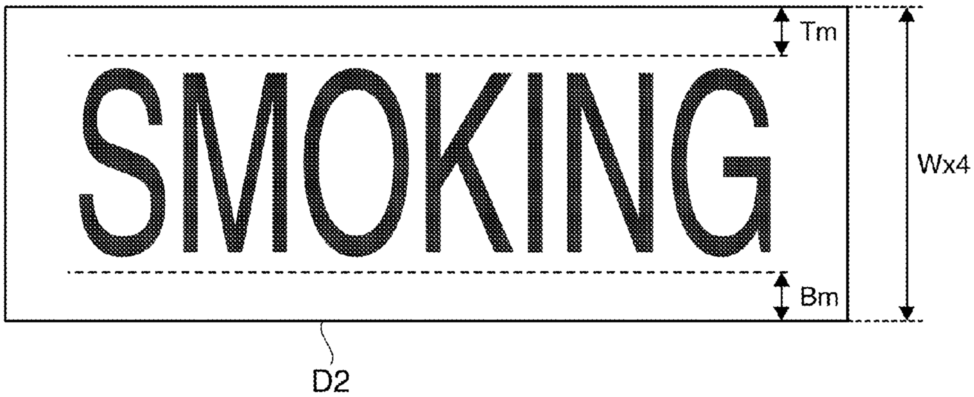

FIGS. 6A and 6B are explanatory diagrams about a printing image, FIG. 6A is an explanatory diagram of a normal printing image, and FIG. 6B is an explanatory diagram of a four-times enlarged printing image.

As shown in FIG. 6A, in a normal printing image (that is, a printing image which is not enlarged) D1, the width of the printing image represents a tape width W. In actuality, the tape width W is represented by the number of dots.

As shown in FIG. 6B, in a four-times enlarged printing image D2, the width of the enlarged printing image is four times the tape width W. In addition, an upper margin Tm represents a margin located above the character, that is, a non-printing image region in which a dot to be printed is not present. A lower margin Bm represents a margin located under the character. Incidentally, when an outer frame or the like for decorating the character is located above and under the character, the upper margin Tm and the lower margin Bm represent upper and lower margins of the outer frame. The upper margin Tm and the lower margin Bm can be calculated as the number of dots from the layout coordinates of the character or graphics, the layout coordinates included in the enlargement layout information. The margin determining program product 33*b* determines whether or not the total number of dots of the upper margin Tm and the lower margin Bm is equal to or greater than the tape width W.

Back in FIG. 5, if the total number of dots of the upper margin Tm and the lower margin Bm of the enlarged printing image is equal to or greater than the tape width W (step S103: YES), the control section 30 turns on a margin delete flag (step S104). If the total number of dots of the upper margin Tm and the lower margin Bm of the enlarged printing image is not equal to or greater than the tape width W, that is, if the total number of dots of the upper margin Tm and the lower margin Bm of the enlarged printing image is smaller than the tape width W (step S103: NO), the control section 30 turns off the margin delete flag (step S105). Here, the margin delete flag is a flag which is stored in the RAM 32.

The control section 30 generates image data of the enlarged printing image by executing the image data generating program product 33*c* (step S106). Specifically, the control section 30 generates the image data by acquiring font data of the character, graphics, and the like, from the CGROM 34, and arranging the font data on the layout coordinates based on the enlargement layout information. At this time, the image data of the enlarged printing image also includes the upper margin Tm and the lower margin Bm. The control section 30 here corresponds to an image data generating section.

The control section 30 checks the margin delete flag, and determines whether or not there is a deletable margin (step S107). If there is a deletable margin (step S107: YES), the control section 30 executes the printing program product 33*d*, and sequentially prints the image data of the enlarged printing image on the tape T other than the printing image corresponding to the deletable margin (step S108). Specifically, the control section 30 prints the image data of the enlarged printing image from the upper side in the tape width direction while not printing the printing image corresponding to the deletable margin. Then, the control section 30 makes the head driving section 42 and the conveyance driving section 43 drive the thermal head 15 and the conveying mechanism 16, respectively, and thereby makes them print an image according to the image data on the tape T. After that, when the control section 30 makes the cutter driving section 44 drive the cutter unit 18, the tape T is cut. The above operations are performed sequentially. The control section 30, the head driving section 42, the conveyance driving section 43, the thermal head 15, and the conveying mechanism 16 here correspond to a printing section. Then, the control section 30 ends the large-size printing processing.

If there is no deletable margin (step S107: NO), the control section 30 sequentially prints all the image data of the enlarged printing image on the tape T (step S109). Then, the control section 30 ends the large-size printing processing.

Figure 7A:
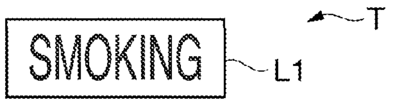
FIGS. 7A to 7C are plan views showing a printed label, FIG. 7A being a plan view of a label on which normal printing is performed, FIG. 7B being a plan view of a label when a printing image corresponding to a margin is printed in large-size printing, and FIG. 7C being a plan view of a label in which a printing image part corresponding to a margin is not printed in large-size printing.
Figure 7B:
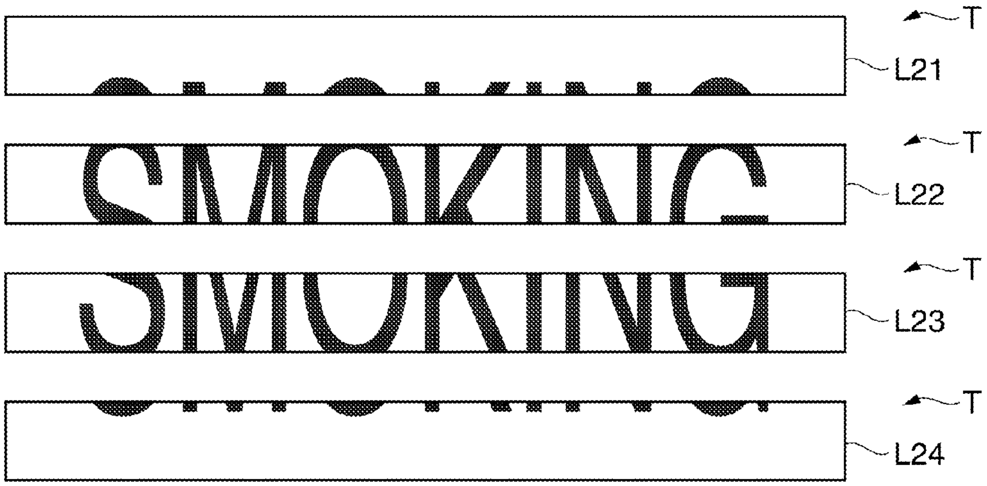
Figure 7C:
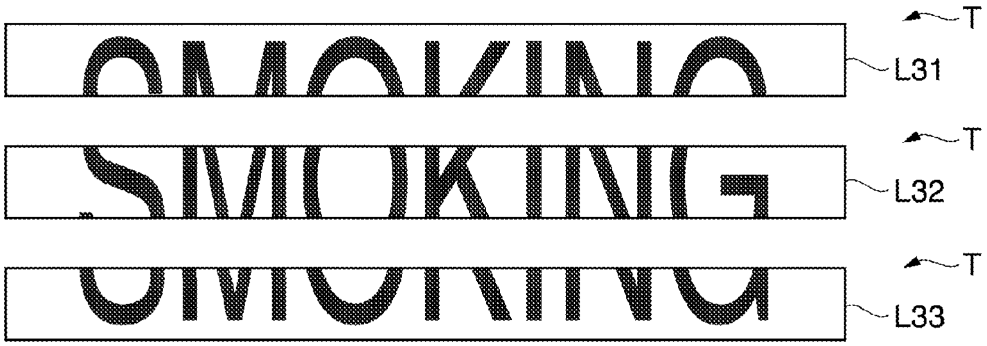

Here, a printed label formed by printing performed by the tape printer 1 will be described. FIGS. 7A to 7C are plan views showing a printed label, FIG. 7A is a plan view of a label on which normal printing is performed, FIG. 7B is a plan view of a label when a printing image corresponding to a margin is printed in large-size printing, and FIG. 7C is a plan view of a label in which a printing image part corresponding to a margin is not printed in large-size printing.

As shown in FIG. 7A, a normally printed label L1 on which printing is performed in normal printing is one label printed based on the normal printing image D1 shown in FIG. 6A. On the other hand, FIG. 7B shows a four-times enlarged printed label (tape parts L21, L22, L23, and L24) obtained by an existing tape printer as a result of large-size printing being performed with a magnification set at four times. As shown in FIG. 7B, the upper margin Tm is present in the tape part L21, the lower margin Bm is present in the tape part L24, and, in both parts, the number of dots to be printed is smaller than that in L22 and L23. As a result, the tape part L21 and the tape part L24 sometimes contain more unnecessary portions.

With the tape printer 1 of this embodiment, the margins in the tape part L21 and the tape part L24 shown in FIG. 7B are not subjected to printing or output, and, as shown in FIG. 7C, only a tape part L31, a tape part L32, and a tape parts L33 can be subjected to printing and then output.

According to the first embodiment described above, the following effects can be obtained.

(1) The tape printer 1 sequentially prints the image data of an enlarged printing image other than margins which are an upper margin and a lower margin whose sum is equal to or greater than the tape width W. As a result, since the printing image part corresponding to the upper margin Tm or the lower margin Bm is not subjected to printing or output when the upper margin Tm or the lower margin Bm is equal to or greater than the tape width W, it is possible to reduce use of the tape T in large-size printing.

(2) In the tape printer 1, when a tape cartridge 2 with a narrow tape width W is used in large-size printing, there is a high possibility that the sum of the upper margin Tm and the lower margin Bm becomes equal to or greater than the tape width W. Therefore, when a tape cartridge 2 with a narrow tape width W is used, the effectiveness of reduction of use of the tape T is enhanced. That is, it is possible to reduce use of the tape T when large-size printing is performed by using a tape cartridge 2 with a limited width.

(3) In the tape printer 1, when large-size printing of a character or graphics which is small relative to the tape width W is performed, there is a high possibility that the sum of the upper margin Tm and the lower margin Bm becomes equal to or greater than the tape width W. Therefore, the effectiveness of reduction of use of the tape T is enhanced.

Second Embodiment

Hereinafter, a second embodiment will be described.

In the second embodiment, a tape printer 100 generating image data of an enlarged printing image which does not include a tape part corresponding to a margin which is equal to or greater than a tape width W at the time of large-size printing will be described.

The appearance and mechanism of the tape printer 100 according to the second embodiment are the same as those of the tape printer 1 according to the first embodiment, and therefore descriptions thereof will be omitted. Moreover, a block diagram showing a circuit configuration of the tape printer 100 according to the second embodiment is also the same as that of the tape printer 1 according to the first embodiment, and therefore descriptions thereof will be omitted. Furthermore, the operation and screen display of the tape printer 100 according to the second embodiment, the operation and screen display performed at the time of large-size printing, are also the same as those of the tape printer 1 according to the first embodiment, and therefore descriptions thereof will be omitted.

Next, large-size printing processing in the tape printer 100 according to the second embodiment will be described. As is the case with the first embodiment, when large-size printing is performed by the user in the large-size printing confirmation screen G3, the tape printer 100 performs large-size printing processing (a flowchart) shown in FIG. 8.

Figure 8:
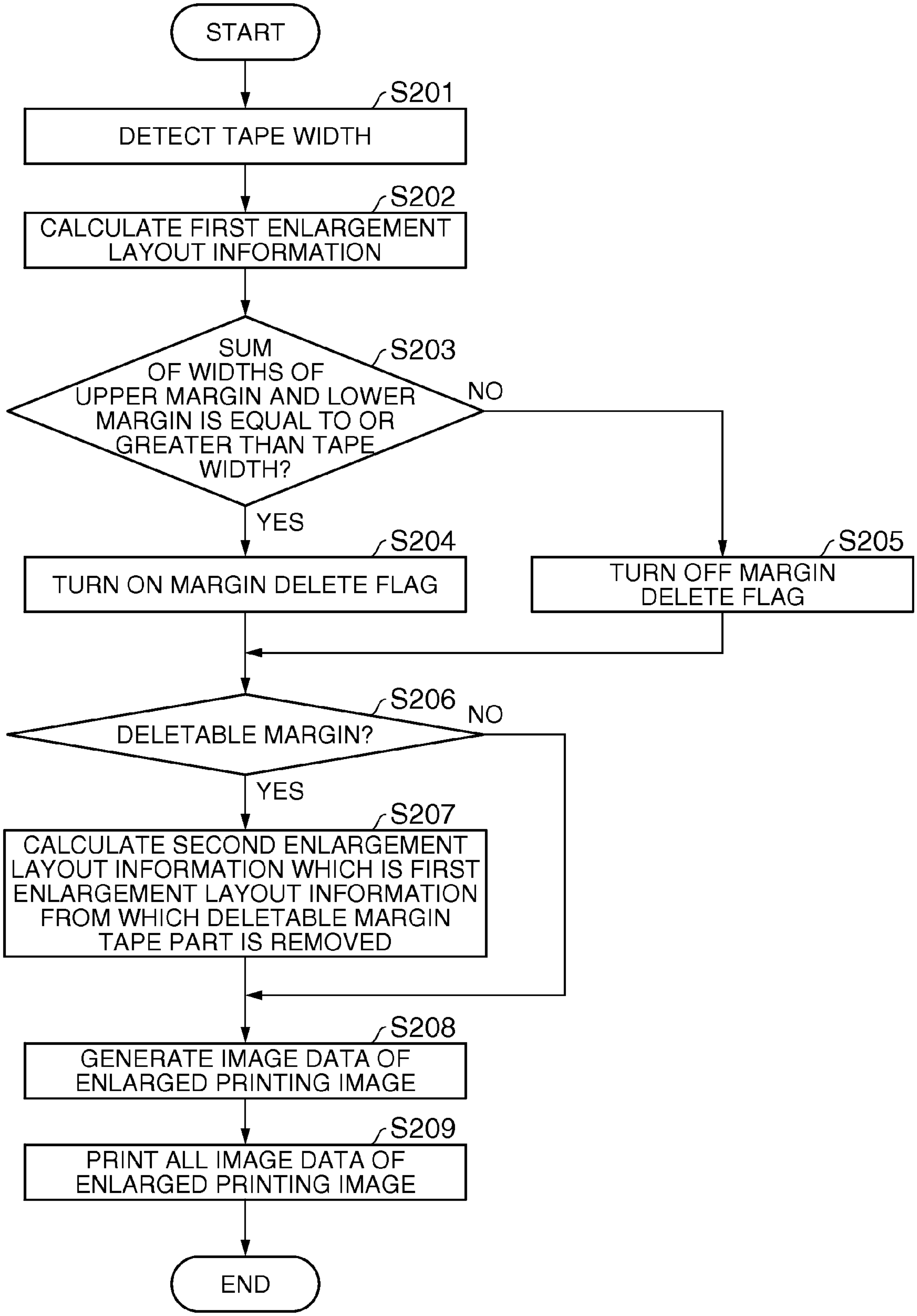
FIG. 8 is a flowchart for explaining large-size printing processing according to a second embodiment.

FIG. 8 is a flowchart for explaining the large-size printing processing according to the second embodiment. The large-size printing processing will be described by using FIG. 8.

When large-size printing is performed by the user, the control section 30 detects the tape width of the tape cartridge 2 placed in the concave portion 13 based on the information from the identification sensor 19 (step S201). Then, the control section 30 calculates first enlargement layout information by executing the layout calculating program product 33*a* (step S202). Specifically, the control section 30 calculates the layout coordinates of the character or graphics in an enlarged printing image based on the tape width, the magnification, the setting information on the entered character or graphics and the size thereof, the setting information on the decoration of the character or graphics, etc. The control section 30 here corresponds to a first layout calculating section.

Next, the control section 30 determines whether or not the sum of the upper margin Tm and the lower margin Bm of the enlarged printing image in the tape width direction is equal to or greater than the tape width W by executing the margin determining program product 33*b* (step S203). Here, the determination processing executed by the margin determining program product 33*b*, the processing as to whether or not the sum of the upper margin Tm and the lower margin Bm is equal to or greater than the tape width W, is the same as that of the first embodiment.

If the sum of the upper margin Tm and the lower margin Bm of the enlarged printing image is equal to or greater than the tape width W (step S203: YES), the control section 30 turns on a margin delete flag (step S204). If the sum of the upper margin Tm and the lower margin Bm of the enlarged printing image is not equal to or greater than the tape width W, that is, if the sum of the upper margin Tm and the lower margin Bm of the enlarged printing image is smaller than the tape width W (step S203: NO), the control section 30 turns off the margin delete flag (step S205).

The control section 30 checks the margin delete flag, and determines whether or not there is a deletable margin (step S206). If there is a deletable margin (step S206: YES), the control section 30 calculates, by executing the layout calculating program product 33*a*, second enlargement layout information which is the first enlargement layout information from which the deletable margin is removed (step S207). Specifically, the control section 30 calculates the enlargement layout information which is the first enlargement layout information from which a printing image in a margin of the sum of the upper margin Tm and the lower margin Bm, the printing image having the tape width W, is deleted. The control section 30 here corresponds to a second layout calculating section.

If there is no deletable margin (step S206: NO), the control section 30 does not perform processing in step S207.

Next, the control section 30 generates image data of the enlarged printing image by executing the image data generating program product 33*c* (step S208). At this time, if the second enlargement layout information has been calculated, the control section 30 generates image data of the enlarged printing image based on the second enlargement layout information, and, if the second enlargement layout information has not been calculated, the control section 30 generates image data of the enlarged printing image based on the first enlargement layout information. The control section 30 here corresponds to the image data generating section.

Here, image data of an enlarged printing image will be described, the image data generated when a printing image in a margin of the sum of the upper margin Tm and the lower margin Bm, the printing image having the tape width W, can be deleted.

Figure 9:
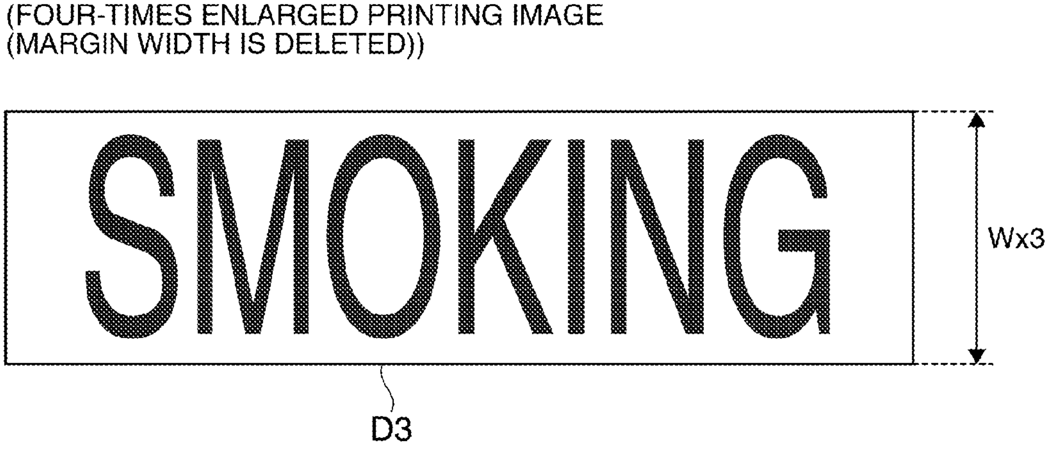
FIG. 9 is an explanatory diagram about an enlarged printing image from which part of a margin is deleted.

FIG. 9 is an explanatory diagram about an enlarged printing image from which a printing image in a margin of the sum of the upper margin and the lower margin, the printing image having the tape width W, is deleted. As shown in FIG. 9, although a four-times enlarged printing image D3 is a four-times enlarged printing image, the width of the enlarged printing image is three times the tape width W because a printing image in a margin of the sum of the upper margin Tm and the lower margin Bm, the printing image having the tape width W, is deleted.

Back in FIG. 8, the control section 30 sequentially prints all the image data of the enlarged printing image by executing the printing program product 33*d* (step S209). The control section 30, the head driving section 42, the conveyance driving section 43, the thermal head 15, and the conveying mechanism 16 at the time of printing correspond to the printing section. Here, as shown in FIG. 9, when a printing image in a margin of the sum of the upper margin Tm and the lower margin Bm, the printing image having the tape width W, can be deleted, there are three printed labels. Then, the control section 30 ends the large-size printing processing.

As is the case with FIG. 7C, the printed labels formed by printing performed by the tape printer 100 are only the tape part L31, the tape part L32, and the tape part L34.

According to the second embodiment described above, the effects similar to the effects (2) and (3) of the first embodiment can be obtained. In addition to these effects, the following effect can be obtained.

The tape printer 100 generates image data of an enlarged printing image which does not include a printing image having the tape width, the printing image corresponding to a margin which is equal to or greater than the tape width W. Then, the tape printer 100 sequentially prints the image data of the enlarged printing image. As a result, when the upper margin Tm or the lower margin Bm is equal to or greater than the tape width W, a part of the upper margin Tm or the lower margin Bm is not subjected to printing or output. This makes it possible to reduce use of the tape T in large-size printing. Moreover, it is possible to reduce the memory usage at the time of generation of the image data of the enlarged printing image.

Moreover, the embodiments described above can be configured as a recording medium etc. which record the program product for realizing the above functions in such a way that the program product can be read by the computer. As the recording medium, various media that can be read by the computer, the media such as a flexible disk and a hard disk, an optical disk such a CD and a DVD, a magneto-optical disk, a memory card and USB memory which incorporate nonvolatile semiconductor memory, and internal memory (semiconductor memory such as RAM and ROM) of an image generating apparatus, can be used.

The invention is not limited in any way by the embodiments thereof described above, and many variations and modifications are possible. Modified examples will be described below.

Modified Example 1

The embodiments described above deal with a case in which, when the sum of the upper margin Tm and the lower margin Bm at the time of large-size printing is equal to or greater than the tape width W, printing is performed by deleting one tape part from the sum of an upper tape part and a lower tape part. However, when the sum of the upper margin Tm and the lower margin Bm is greater than n times ($n \geq 1$) the tape width W, printing may be performed by deleting n tape part from the upper and lower margins. By doing so, use of the tape T can be further reduced.

Modified Example 2

In the embodiments described above, magnification options which can be selected in large-size printing are “TWO TIMES”, “THREE TIMES”, and “FOUR TIMES”. However, other magnification options may be provided.

Modified Example 3

In the embodiments described above, as a printing method for printing a character etc. on the tape T, a thermal transfer method by the thermal head 15 is used; however, the invention is not limited thereto. Other printing methods such as an ink-jet method by which an ink drop is discharged may be used.

What is claimed is:

1. A tape printer for printing on a long tape, the tape printer having a large-size printing function of being configured to divide an enlarged printing image, which has an image width larger than the tape width of the long tape into two or more images, and to sequentially print the two or more images respectively on two or more tape parts of the long tape, so that the enlarged printing image is formed by arranging two or more printed tape parts parallel to each other in a tape width direction, the tape printer comprising:

a tape width detecting section detecting the tape width of the long tape;

a layout determining section determining enlargement layout information indicating the layout of a character or graphics forming the enlarged printing image;

a margin determining section determining the margin widths of an upper margin and a lower margin of the enlarged printing image in the tape width direction based on the enlargement layout information determined by the layout determining section and determining whether the sum of the determined margin widths is equal to or greater than the tape width of the long tape;

an image data generating section generating image data of the enlarged printing image based on the enlargement layout information determined by the layout determining section; and a printing section sequentially printing, on one or more tape parts respectively, the image data of the enlarged printing image other than part of the upper margin and part of the lower margin based on the determination result obtained by the margin determining section.

2. The tape printer according to claim 1, wherein the printing section sequentially prints the image data of the enlarged printing image by deleting margin of n times the tape width from the sum of the upper margin and the lower margin, wherein n is an integer of one or more, when the margin determining section determines that the sum of the widths is equal to or greater than n times the tape width.

3. A method for controlling a tape printer for printing on a long tape, the tape printer having a large-size printing function of being configured to divide an enlarged printing image, which has an image width larger than the tape width of the long tape, into two or more images, and to sequentially print the two or more images respectively on two or more tape parts of the long tape, so that the enlarged printing image is formed by arranging two or more printed tape parts parallel to each other in a tape width direction, the method comprising:

a tape width detection step of detecting the tape width of the long tape;

a layout determination step of determining enlargement layout information indicating the layout of a character or graphics forming the enlarged printing image;

a margin determination step of determining the margin widths of an upper margin and a lower margin of the enlarged printing image in the tape width direction based on the enlargement layout information determined in the layout determination step and determining whether the sum of the determined margin widths is equal to or greater than the tape width of the long tape;

an image data generation step of generating image data of the enlarged printing image based on the enlargement layout information determined by the layout determination step; and a printing step of sequentially printing, on one or more tape parts respectively, the image data of the enlarged printing image other than part of the upper margin and part of the lower margin based on the determination result obtained in the margin determination step.

4. A non-transitory computer-readable medium storing a computer program product for making a computer execute the steps of the method for controlling a tape printer according to claim 3.

5. A method for controlling a tape printer for printing on a long tape, the tape printer having a large-size printing function of being configured to divide an enlarged printing image, which has an image width larger than the tape width of the long tape, into two or more images, and to sequentially print the two or more images respectively on two or more tape parts of the long tape, so that the enlarged printing image is formed by arranging two or more printed tape parts parallel to each other in a tape width direction, the method comprising:

a tape width detection step of detecting the tape width of the long tape;

a first layout determination step of determining first enlargement layout information indicating the layout of a character or graphics forming the enlarged printing image;

a margin determination step of determining the margin widths of an upper margin and a lower margin of the enlarged printing image in the tape width direction based on the first enlargement layout information determined in the first layout determination step and determining whether the sum of the determined margin widths is equal to or greater than the tape width of the long tape;

a second layout determination step of determining second enlargement layout information based on the determination result obtained in the margin determination step, the second enlargement layout information corresponding to the first layout information from which part of the upper margin and part of the lower margin are removed, when the sum of the determined margin widths is equal to or greater than the tape width;

an image data generation step of generating image data of the enlarged printing image based on the second enlargement layout information if the second enlargement layout information is generated by the second layout determination step, otherwise based on the first enlargement information; and a printing step of sequentially printing, on one or more tape parts respectively, the image data of the enlarged printing image.

6. A non-transitory computer-readable medium storing a computer program product for making a computer execute the steps of the method for controlling a tape printer according to claim 5.

* * * * *